Sept. 1, 1931. T. J. PHILLIPS 1,821,896
COMBINATION SLED AND WAGON
Filed Dec. 15, 1930   2 Sheets-Sheet 1
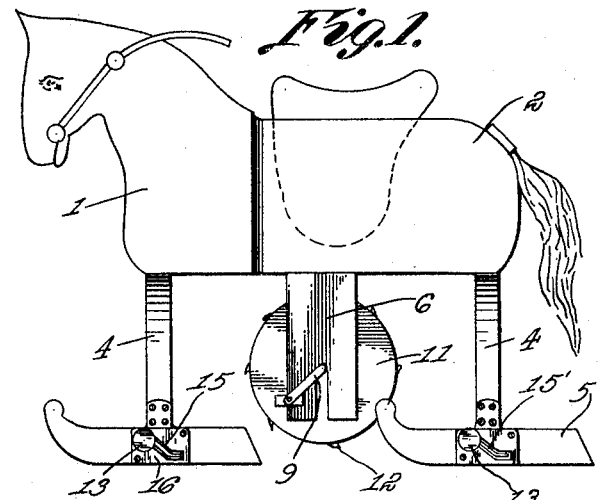
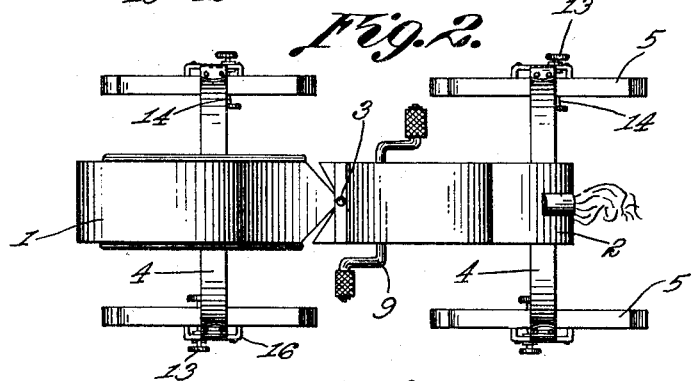
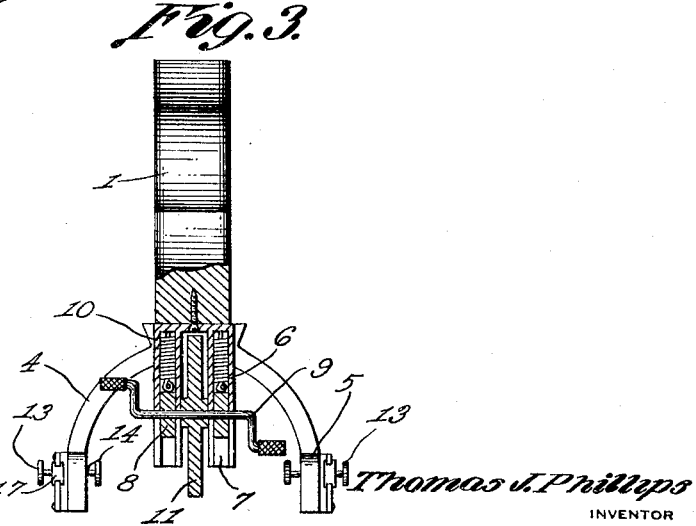

Sept. 1, 1931.　　　T. J. PHILLIPS　　　1,821,896
COMBINATION SLED AND WAGON
Filed Dec. 15, 1930　　2 Sheets-Sheet 2
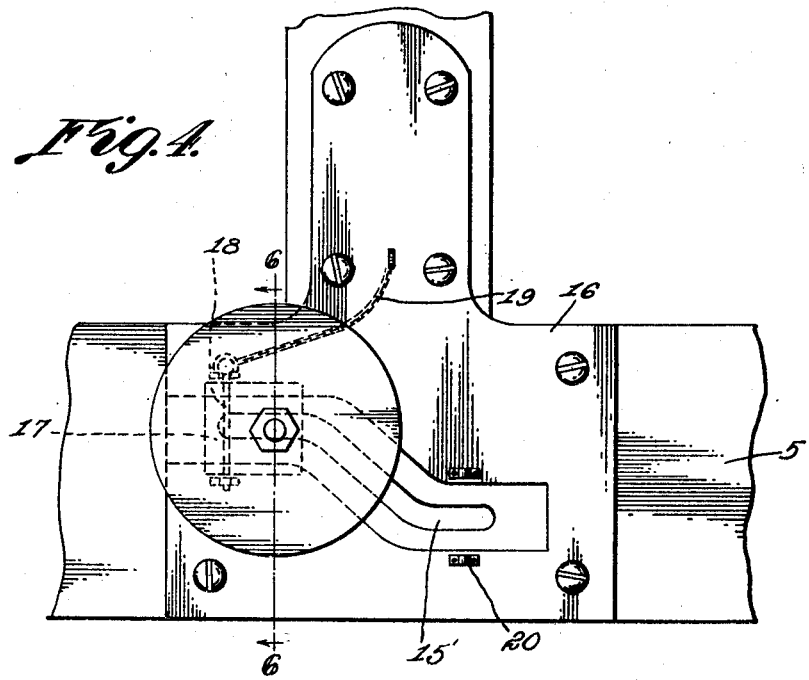
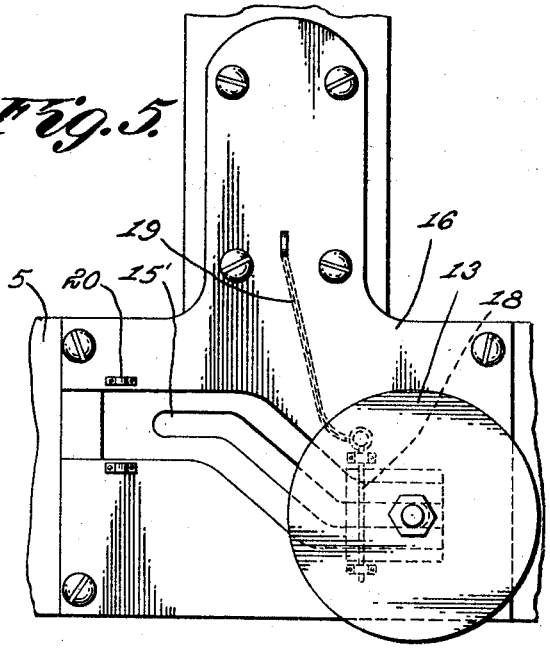
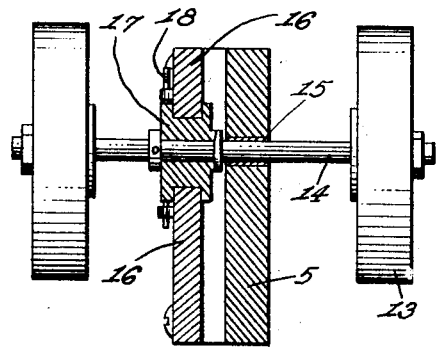
Thomas J. Phillips,
INVENTOR Patented Sept. 1, 1931

1,821,896

UNITED STATES PATENT OFFICE

THOMAS J. PHILLIPS, OF PITTSBURGH, PENNSYLVANIA, ASSIGNOR OF ONE-HALF TO WILBUR F. ORR, OF NEW BETHLEHEM, PENNSYLVANIA

COMBINATION SLED AND WAGON

Application filed December 15, 1930. Serial No. 502,555.

This invention relates to a combined sled and wagon, the present invention being an improvement over that forming the subject matter of a patent granted to me on March 31, 1914, No. 1,091,955, the general object of the present invention being to provide wheels on the runners of the device, with means whereby the wheels can be moved into either operative position or inoperative position, so that the device can be used as a sled or as a wagon.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of the invention.
Figure 2 is a top plan view thereof.
Figure 3 is an end view, partly in section.
Figure 4 is an enlarged detail side view, showing how the wheel assembly is arranged on a runner.
Figure 5 is a similar view, but showing the wheels in operative position.
Figure 6 is a section on line 6—6 of Figure 4.

As shown in these drawings, the body of the device is made in the form of a horse and is composed of the sections 1 and 2 which are pivotally connected together, as shown at 3, so that the front section can be moved to guide the device as it travels along. Leg forming arches 4 are connected with the lower part of the body and a runner 5 is connected to each end of each arch.

A frame 6 depends from the body and has guideways 7 therein for the blocks 8 which carry the pedal shaft 9. The blocks are normally held in raised position by the springs 10 and the shaft carries a wheel 11, the periphery of which is formed with the teeth 12. Thus the rider can place his feet on the pedals and by exerting pressure thereon, the shaft carrying parts will be lowered so that the periphery of the wheel will engage the surface on which the device is resting and then by rotating the shaft, the device will be caused to travel along.

This arrangement is similar to that shown in my patent and the present invention consists in providing the runners with the wheels 13 so that these wheels can be used when the device is to be used on a surface other than ice. The wheels are arranged in pairs, each pair being carried by an axle 14 which passes through a slot 15 in the runner and a slot 15′ in a plate 16 fastened to each runner. A block 17 is slidably arranged in the slot 15′ of the plate and the axle passes through said block. The slots are formed with diagonal intermediate portions and horizontal end portions, the parts being so arranged that when the blocks are in the front ends of the slots, the wheels will be raised out of engagement with the surface, but when the blocks are in the rear portions of the slots, the wheels will contact the surface and extend below the lower edges of the runners so that the runners will be raised off the surface.

A bolt or pin 18 is connected to each plate 16 by a chain 19 and passes through a block and is adapted to be passed through the lugs 20 arranged adjacent the ends of the slots so as to hold the block in either raised or lowered position.

From the foregoing it will be seen that the wheels can be moved to inoperative position above the lower edge of the runners when the device is to be used on ice or snow, as shown in Figures 1 and 4, and when the device is to be used as a wheeled vehicle, the wheel assemblies are lowered, as shown in Figure 5, so that the wheels will engage the surface, with the runners out of engagement with the surface.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a body formed of a front and rear section pivotally connected together, runners supporting each of said sections, wheels adjustably connected with the runners whereby the said wheels can be moved to operative or inoperative position, manually actuated means for retaining the wheels in operative and inoperative positions, and manually operated means for propelling the device.

2. A device of the class described comprising a body, runners supporting the same, each runner having a slot therein composed of an intermediate diagonal part and horizontal end parts, a block slidably arranged in the slot, means for holding the block in either horizontal part of the slot, a shaft passing through each block and wheels carried by the shafts.

In testimony whereof I affix my signature.

THOMAS J. PHILLIPS.